United States Patent
Shatunov et al.

(10) Patent No.: US 11,031,627 B2
(45) Date of Patent: Jun. 8, 2021

(54) ADDITIVE FOR ELECTROLYTE OF LITHIUM BATTERY, ELECTROLYTE FOR LITHIUM BATTERY INCLUDING SAME, AND LITHIUM BATTERY EMPLOYING SAME ELECTROLYTE

(71) Applicant: SAMSUNG SDI CO., LTD., Yongin-si (KR)

(72) Inventors: Pavel Alexandrovich Shatunov, Yongin-si (KR); Sanghoon Kim, Yongin-si (KR); Woocheol Shin, Yongin-si (KR); Harim Lee, Yongin-si (KR); Inhaeng Cho, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 49 days.

(21) Appl. No.: 16/316,737

(22) PCT Filed: Jul. 17, 2017

(86) PCT No.: PCT/KR2017/007653
§ 371 (c)(1),
(2) Date: Jan. 10, 2019

(87) PCT Pub. No.: WO2018/021746
PCT Pub. Date: Feb. 1, 2018

(65) Prior Publication Data
US 2019/0319308 A1    Oct. 17, 2019

(30) Foreign Application Priority Data

Jul. 25, 2016 (KR) .................. 10-2016-0094141

(51) Int. Cl.
*H01M 10/0567* (2010.01)
*H01M 10/0525* (2010.01)
*H01M 10/0569* (2010.01)

(52) U.S. Cl.
CPC ... *H01M 10/0567* (2013.01); *H01M 10/0525* (2013.01); *H01M 10/0569* (2013.01); *H01M 2300/0025* (2013.01)

(58) Field of Classification Search
CPC ......... H01M 10/0567; H01M 10/0525; H01M 10/0569; H01M 2300/0025
See application file for complete search history.

(56) References Cited

U.S. PATENT DOCUMENTS 5,650,245 A * 7/1997 Zhong ............... H01M 10/0567
429/331
7,494,746 B2 * 2/2009 Tarnopolsky ..... H01M 10/0567
429/332

(Continued)

FOREIGN PATENT DOCUMENTS

EP     1585142 A1    3/2005
EP     1585142    * 10/2005

(Continued)

OTHER PUBLICATIONS

International Search Report (EN)—PCT/KR2017/007653 dated Sep. 29, 2017.

(Continued)

*Primary Examiner* — Alexander Usyatinsky
(74) *Attorney, Agent, or Firm* — Lee IP Law, P.C.

(57) ABSTRACT

Provided are an additive for an electrolyte for a lithium battery, an electrolyte for a lithium battery, the electrolyte including the additive, and a lithium battery using the electrolyte. The additive includes a compound represented by Formula 1:

$$[P_4O_{10}]_x\text{-}[B(OSiR^1R^2R^3)_3]_y \qquad \text{Formula 1}$$

wherein $R_1$, $R_2$, $R_3$, and the molar ratio of x to y (x/y) are as defined in the specification.

(Continued)

By adding the compound to the electrolyte, the lifetime characteristics of the lithium battery at high temperature may be improved.

13 Claims, 4 Drawing Sheets

(56) References Cited

U.S. PATENT DOCUMENTS

| | | | |
|---|---|---|---|
| 8,691,448 B2 | 4/2014 | Yoon et al. | |
| 8,945,776 B2 | 2/2015 | Kim et al. | |
| 2005/0221195 A1 | 10/2005 | Uchida et al. | |
| 2008/0254358 A1* | 10/2008 | Takase | H01M 10/0569 |
| | | | 429/163 |
| 2012/0231325 A1* | 9/2012 | Yoon | H01M 10/052 |
| | | | 429/163 |
| 2012/0244419 A1 | 9/2012 | Kwak et al. | |
| 2012/0315536 A1 | 9/2012 | Kwak et al. | |

FOREIGN PATENT DOCUMENTS

| | | |
|---|---|---|
| JP | 2001-057237 A | 2/2001 |
| JP | 2008-130544 A | 6/2008 |
| KR | 10-2008-0030929 A | 4/2008 |
| KR | 10-2010-0086370 A | 7/2010 |
| KR | 10-1069100 B1 | 9/2011 |
| KR | 10-1340031 B1 | 12/2013 |

OTHER PUBLICATIONS

International Search Report (KR)—PCT/KR2017/007653 dated Sep. 29, 2017.

* cited by examiner

ADDITIVE FOR ELECTROLYTE OF LITHIUM BATTERY, ELECTROLYTE FOR LITHIUM BATTERY INCLUDING SAME, AND LITHIUM BATTERY EMPLOYING SAME ELECTROLYTE

CROSS REFERENCE TO RELATED APPLICATIONS

This is the U.S. national phase application based on PCT Application No. PCT/KR2017/007653, filed Jul. 17, 2017, which is based on Korean Patent Application No. 10-2016-0094141, filed Jul. 25, 2016, the entire contents of all of which are hereby incorporated by reference.

TECHNICAL FIELD

The present disclosure relates to an additive for an electrolyte for a lithium battery, an electrolyte for a lithium battery, the electrolyte including the additive, and a lithium battery using the electrolyte.

BACKGROUND ART

Lithium batteries are used as power sources for portable electronic devices such as video cameras, mobile phones, and notebook computers. Rechargeable lithium secondary batteries have an energy density per unit weight three times or more higher than that of lead storage batteries, nickel-cadmium batteries, nickel-metal hydride batteries, and nickel-zinc batteries, and can be charged at high speed.

Since lithium batteries operate at high operating voltages, aqueous electrolytic solutions that are highly reactive with lithium cannot be used. An organic electrolytic solution is generally used for lithium batteries. Organic electrolytic solutions are prepared by dissolving lithium salts in organic solvents. Organic solvents suitable for such organic electrolytic solutions may have stability at a high voltage, and have a high ionic conductivity, a high dielectric constant, and a low viscosity.

When a polar, carbonaceous non-aqueous solvent is used in a lithium battery, a side reaction takes place between an electrolytic solution and at least one of a negative electrode and a positive electrode during initial charging, and thus, irreversible reactions occur in which charge is used excessively.

A passivation layer such as a solid electrolyte interface layer (SEI layer) is formed on the surface of a negative electrode by the irreversible reactions. The SEI layer prevents decomposition of an electrolytic solution during charging and discharging and may act as an ion tunnel. The higher the stability and the lower the resistance of the SEI layer, the further the lifespan of lithium batteries may be increased.

Further, a protective layer is formed on the surface of a positive electrode by irreversible reactions. The protective layer prevents decomposition of the electrolytic solution during charging and discharging and may act as an ion tunnel. The higher the stability of the protective layer at high temperatures, the further the lifespan of lithium batteries may be increased.

Various additives are used to stabilize the SEI layer and/or protective layer. However, when SEI layers are formed using additives of the related art, formed SEI layers easily deteriorate at high temperatures. That is, the stability of the SEI layer and/or protective layer deteriorates at high temperatures.

Therefore, there is a need for studies on an electrolyte capable of forming an SEI and/or protective layer with improved high-temperature stability.

DESCRIPTION OF EMBODIMENTS

Technical Problem

One aspect is to provide an additive for an electrolyte for a lithium battery, the additive capable of improving lifetime characteristics of the lithium battery at high temperatures.

Another aspect is to provide an electrolyte for a lithium battery, the electrolyte including the additive.

Another aspect is to provide a lithium battery including the electrolyte.

Solution to Problem

An aspect provides an additive for an electrolyte for a lithium battery, the additive including a compound represented by Formula 1:

$$[P_4O_{10}]_x\text{-}[B(OSiR^1R^2R^3)_3]_y \qquad \text{Formula 1}$$

wherein $R^1$, $R^2$, and $R^3$ may each independently be a substituted or unsubstituted C1-C30 alkyl group, a substituted or unsubstituted C1-C30 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbon cyclic group, a substituted or unsubstituted C4-C20 carbon cyclic alkyl group, a substituted or unsubstituted C2-C20 heterocyclic group, a substituted or unsubstituted C2-C20 heterocyclic alkyl group, a cyano group, a hydroxy group, a cyano group, an amino group, an amidino group, a hydrazine group, a hydrazone group, a nitro group, a thiol group, phosphonate, a silyl group, a carboxyl group or a salt thereof, a sulfonyl group, a sulfamoyl group, a sulfonic acid group or a salt thereof, or a phosphoric acid or a salt thereof, and a molar ratio of x to y (x/y) may be in the range of 0.025 to 2.5.

Another aspect provides an electrolyte for a lithium battery, the electrolyte including a non-aqueous organic solvent, a lithium salt, and the additive described above.

Another aspect provides a lithium battery including a positive electrode, a negative electrode, and the electrolyte.

Advantageous Effects of Disclosure

By adding an additive for an electrolyte for a lithium battery according to an embodiment to an electrolyte, the lifetime characteristics of a lithium battery including the electrolyte at high temperature may be improved.

MODE OF DISCLOSURE

Hereinafter, an additive for an electrolyte for a lithium battery according to an embodiment, an electrolyte for a lithium battery including the additive, and a lithium battery using the electrolyte will be described in detail. However, these embodiments are provided herein for illustrative purpose, and do not limit the present disclosure, which will be defined only by the scope of claims.

An additive for an electrolyte for a lithium battery according to an embodiment includes a compound represented by Formula 1:

[P$_4$O$_{10}$]$_x$·[B(OSiR$^1$R$^2$R$^3$)$_3$]$_y$      Formula 1 wherein R$^1$, R$^2$, and R$^3$ may each independently be a substituted or unsubstituted C1-C30 alkyl group, a substituted or unsubstituted C1-C30 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbon cyclic group, a substituted or unsubstituted C4-C20 carbon cyclic alkyl group, a substituted or unsubstituted C2-C20 heterocyclic group, a substituted or unsubstituted C2-C20 heterocyclic alkyl group, a cyano group, a hydroxy group, a cyano group, an amino group, an amidino group, a hydrazine group, a hydrazone group, a nitro group, a thiol group, phosphonate, a silyl group, a carboxyl group or a salt thereof, a sulfonyl group, a sulfamoyl group, a sulfonic acid group or a salt thereof, or a phosphoric acid or a salt thereof, and a molar ratio of x toy (x/y) may be in the range of 0.025 to 2.5.

In one embodiment, R$^1$, R$^2$, and R$^3$ in Formula 1 may each independently be a substituted or unsubstituted C1-C30 alkyl group, a substituted or unsubstituted C2-C20 alkenyl group, a substituted or unsubstituted C2-C20 alkynyl group, or a substituted or unsubstituted C6-C20 aryl group.

In one embodiment, R$^1$, R$^2$, and R$^3$ in Formula 1 may each independently be a substituted or unsubstituted C1-C30 alkyl group. For example, R$^1$, R$^2$, and R$^3$ in Formula 1 may each independently be a methyl group, an ethyl group, a propyl group, an Isopropyl group, a butyl group, a tert-butyl group, a trifluoromethyl group, or a tetrafluoroethyl group.

In one embodiment, the compound may be represented by Formula 2:

[P$_4$O$_{10}$]$_x$·[B(OSi(CH$_3$)$_3$)$_3$]$_y$      Formula 2 wherein the molar ratio of x to y (x/y) may be in the range of 0.025 to 2.5.

The molar ratio of x to y (x/y) in Formulae 1 and 2 may be in the range of 0.025 to 2.5. Within this range, the optimal capacity retention rate may be obtained.

In one embodiment, the compound represented by Formula 1 may be in an oligomeric form. The compound represented Formula 1 may be in a combination state in the oligomer form rather than a complete single compound. The structure and composition of the oligomeric form may be affected by the ratio of starting materials and the conditions of synthesis.

For example, the compound may be a mixture of oligomers including both trimethylsilyl phosphate and trimethylsilyl borate fragments as follows.

However, these structures of oligomers are only an illustrative example, and the actual structure of the compound is not precisely defined, and may include other structures of oligomers.

The definitions of the functional groups and substitutable substituents described in the above-mentioned formulas are as follows.

The term "alkyl" used herein refers to fully saturated branched or unbranched (or linear) hydrocarbons.

Non-limiting examples of the "alkyl" include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

At least one hydrogen atom of the "alkyl" may be substituted with a halogen atom, a C1-C20 alkyl group substituted with a halogen atom (for example: CCF$_3$, CHCF$_2$, CH$_2$F, CCl$_3$, etc.), a C1-C20 alkoxy, a C2-C20 alkoxyalkyl, a hydroxyl group, a nitro group, a cyano group, an amino group, an amidino group, a hydrazine, a hydrazone, a carboxyl group or a salt thereof, a sulfonyl group, a sulfamoyl group, a sulfonic acid group or a salt thereof, a phosphoric acid or a salt thereof, or C1-C20 alkyl group, C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen atom" used herein includes fluorine, bromine, chlorine, iodine and the like.

The term "C1-C20 alkyl group substituted by a halogen atom" refers to a C1-C20 alkyl group substituted with at least one halo group, and includes a polyhaloalkyl containing a monohaloalkyl, a dihaloalkyl, or a perhaloalkyl.

Monohaloalkyl refers to an alkyl group that contains one iodine, one bromine, one chlorine, or one fluorine, and a dihaloalkyl and a polyhaloalkyl each refer to an alkyl group having two or more identical or different halo atoms.

The term "alkoxy" used herein is represented by alkyl-O—, wherein the alkyl is the same as described above. Non-limiting examples of the alkoxy include methoxy, ethoxy, propoxy, 2-propoxy, butoxy, tert-butoxy, pentyloxy, hexyloxy, cyclopropoxy, and cyclohexyloxy. At least one hydrogen atom in the alkoxy group may be substituted with the same substituent as described above in connection with the alkyl group.

The term "alkoxyalkyl" used herein refers to the case where the alkyl group is substituted with the alkoxy described above. At least one hydrogen atom in the alkoxyalkyl group may be substituted with the same substituent as described above in connection with the alkyl group. As such, the term "alkoxyalkyl" includes substituted alkoxyalkyl moieties.

The term "alkenyl" used herein refers to branched or unbranched hydrocarbons having at least one carbon-carbon double bond. Non-limiting examples of the alkenyl group include vinyl, allyl, butenyl, isopropenyl, isobutenyl, etc., and at least one of the hydrogen atoms of the alkenyl may be substituted with the same substituent as described above in connection with the alkyl group.

The term "alkynyl" used herein refers to branched or unbranched hydrocarbons having at least one carbon-carbon triple bond. Non-limiting examples of the "alkynyl" include ethynyl, butynyl, isobutynyl, isopropynyl, and the like.

At least one hydrogen atom in the alkynyl may be substituted with the same substituent as described above in connection with the alkyl group.

The term "aryl" used herein may be used alone or in combination and may mean an aromatic hydrocarbon containing one or more rings.

The term "aryl" may include a group in which an aromatic ring is fused to at least one cycloalkyl ring.

Non-limiting examples of the "aryl" include phenyl, naphthyl, tetrahydronaphthyl, and the like.

At least one hydrogen atom in the "aryl" may be substituted with the same substituent as described above in connection with the alkyl group.

The term "arylalkyl" refers to alkyl substituted with aryl. Examples of arylalkyl include benzyl or phenyl-CH$_2$CH$_2$—.

The term "aryloxy" used herein is represented by —O-aryl, and examples of the aryloxy group include phenoxy and the like. At least one hydrogen atom in the "aryloxy" may be substituted with the same substituent as described above in connection with the alkyl group.

The term "heteroaryl" used herein refers to a monocyclic or bicyclic organic compound having at least one hetero atom selected from N, O, P, or S and the remaining ring atoms being carbon. The heteroaryl group may contain, for example, 1 to 5 heteroatoms, and 5 to 10 ring members. S or N may be oxidized to have various oxidation states.

At least one hydrogen atom in the "heteroaryl" may be substituted with the same substituent as described above in connection with the alkyl group.

The term "heteroarylalkyl" refers to an alkyl substituted with heteroaryl.

The term "heteroaryloxy" refers to an —O-heteroaryl moiety. At least one hydrogen atom in the "heteroaryloxy" may be substituted with the same substituent as described above in connection with the alkyl group.

The term "heteroarylalkyloxy" refers to alkyl substituted with —O-heteroaryl. At least one hydrogen atom in the "heteroaryloxyalkyl" may be substituted with the same substituent as described above in connection with the alkyl group.

The "carbon ring" used herein refers to a saturated or partially unsaturated non-aromatic monocyclic, bicyclic or tricyclic hydrocarbon group.

Examples of the carbon ring include cyclopentyl, cyclopentenyl, cyclohexyl, cyclohexenyl, adamantly, and the like.

At least one hydrogen atom in the "carbon ring" may be substituted with the same substituent as described above in connection with the alkyl group.

The "heterocyclic group" used herein refers to a ring group consisting of 5 to 10 atoms containing hetero atoms such as nitrogen, sulfur, phosphorus, oxygen and the like, and examples thereof include pyridyl and the like. At least one hydrogen atom in such a heterocyclic group may be substituted as in the case of the alkyl group described above.

The term "heterocyclicoxy" refers to an —O-heterocyce, and at least one hydrogen atom in the heterocyclic oxy group may be substituted as in the case of the alkyl group described above.

The term "sulfonyl" refers to R''—SO$_2$—, wherein R'' is hydrogen, alkyl, aryl, heteroaryl, aryl-alkyl, heteroaryl-alkyl, alkoxy, aryloxy, cycloalkyl, or heterocyclic group.

The term "sulfamoyl" includes H$_2$NS(O$_2$)—, alkyl-NHS(O$_2$)—, (alkyl)$_2$NS(O$_2$)— aryl-NHS(O$_2$)—, alkyl-(aryl)-NS(O$_2$)—, (aryl)$_2$NS(O)$_2$, heteroaryl-NHS(O$_2$)—, (aryl-alkyl)-NHS(O$_2$)—, or (heteroaryl-alkyl)-NHS(O$_2$)—.

At least one hydrogen atom in the "sulfamoyl" may be substituted as described above in connection with the alkyl group.

The term "amino group" refers to the case where the nitrogen atom is covalently bonded to at least one carbon or hetero atom. The amino group includes, for example, —NH$_2$ and substituted moieties thereof.

The term "amino group" includes an alkyl amino group in which nitrogen is bonded to at least one additional alkyl group, and an "aryl amino" and a "diaryl amino" group in which at least one or more or at least two or more of the nitrogen is bonded to an independently selected aryl group.

An electrolyte for a lithium battery according to an embodiment includes a non-aqueous organic solvent, a lithium salt, and the additive including the compound represented by Formula 1 below:

Formula 1 wherein $R^1$, $R^2$, and $R^3$ may each independently be a substituted or unsubstituted C1-C30 alkyl group, a substituted or unsubstituted C1-C30 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbon cyclic group, a substituted or unsubstituted C4-C20 carbon cyclic alkyl group, a substituted or unsubstituted C2-C20 heterocyclic group, a substituted or unsubstituted C2-C20 heterocyclicalkyl group, a cyano group, a hydroxy group, a cyano group, an amino group, an amidino group, a hydrazine group, a hydrazone group, a nitro group, a thiol group, phosphonate, a silyl group, a carboxyl group or a salt thereof, a sulfonyl group, a sulfamoyl group, a sulfonic acid group or a salt thereof, or a phosphoric acid or a salt thereof, and a molar ratio of x to y (x/y) may be in the range of 0.025 to 2.5.

Due to the inclusion of the compound as an additive in the electrolyte for the lithium battery, a decomposition reaction occurs on the surface of each of the positive electrode and the negative electrode to form a solid electrolyte interface (SEI) at the interface of the positive electrode and the negative electrode, leading to improved stability.

The amount of the compound represented by Formula 1 in the electrolyte may be less than 2 wt % by weight based on the total weight of the electrolyte. For example, the amount of the compound in the organic electrolytic solution may be 0.001 wt % by weight or more and less than 2 wt % by weight based on the total weight of the organic electrolytic solution. For example, the amount of the compound may be in the range of 0.01 wt % to 1.5 wt % based on the total weight of the electrolyte. For example, the amount of the compound may be in the range of 0.1 wt % to 1 wt % based on the total weight of the electrolyte. Within the amount ranges, a lithium secondary battery may have improved safety improvement effect without a decrease in the lifetime characteristics and the output characteristics of the lithium secondary battery.

The non-aqueous organic solvent acts as a medium through which ions involved in the electrochemical reaction of a battery move.

The non-aqueous organic solvent may include at least one selected from a carbonate solvent, an ester solvent, an ether solvent, a ketone solvent, an alcohol solvent, and an aprotic solvent.

Examples of the carbonate solvent are dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), and butylene carbonate (BC). Examples of the ester solvent are methyl acetate, ethyl acetate, n-propyl acetate, dimethylacetate, methyl propionate, ethyl propionate, γ-butyrolactone, decanolide, valerolactone, mevalonolactone, caprolactone, and the like.

Examples of the ether solvent are dibutyl ether, tetraglyme, diglyme, dimethoxyethane, 2-methyltetrahydrofuran, and tetrahydrofuran. Examples of the ketone-based solvent are cyclohexanone and the like. Examples of the alcohol-based solvent are ethyl alcohol, isopropyl alcohol, etc. Examples of the aprotic solvent are nitriles such as R—CN (R is a C2 to C20 linear, branched or cyclic hydrocarbon group and may include a double bond aromatic ring or ether bond); amides such as dimethylformamide; and dioxolane sulfolanes such as 1,3-dioxolane.

The non-aqueous organic solvent may be used alone or in combination. When one or more of the non-aqueous organic solvents are used in combination, the mixed ratio may be appropriately adjusted depending on the performance of a battery, which would be understandable by people involving in the related art.

In addition, in the case of the carbonate-based solvent, cyclic carbonate and chain carbonate may be mixed together. In this case, mixing of the cyclic carbonate and the chain carbonate in a volume ratio of about 1:1 to about 1:9 may provide excellent performance of the electrolytic solution.

The non-aqueous organic solvent may further include, in addition to the carbonate solvent, the aromatic hydrocarbon organic solvent. In this regard, the carbonate solvent and the aromatic hydrocarbon organic solvent may be mixed in a volume ratio of about 1:1 to about 30:1.

As the aromatic hydrocarbon organic solvent, an aromatic hydrocarbon compound of Formula 4 below may be used.

[Formula 4]

$R_1$ to $R_6$ in Formula 4 may each independently hydrogen, a halogen, a C1 to C10 alkyl group, a C1 to C10 haloalkyl group, or a combination thereof.

The aromatic hydrocarbon organic solvent may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate compound represented by Formula 5 to improve the lifetime of a battery.

[Formula 5]

$R_7$ and $R_8$ in Formula 5 may each independently be hydrogen, a halogen group, a cyano group (CN), a nitro group ($NO_2$), or a C1 to C5 fluoroalkyl group, and at least one of $R_7$ and $R_8$ may be a halogen group, a cyano group (CN), a nitro group ($NO_2$), or a C1 to C5 fluoroalkyl group.

Examples of the ethylene carbonate compound are difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, or the like. When the vinylene carbonate or the ethylene carbonate compound is further used, the lifetime may be improved by appropriately controlling the amounts of the vinylene carbonate and ethylene carbonate compound.

The lithium salt is dissolved in the non-aqueous organic solvent to act as a source of lithium ions in a lithium secondary battery to enable an operation thereof and to accelerate the movement of lithium ions between the positive electrode and the negative electrode. Examples of the lithium salt are $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are each a natural number), LiCl, LiI, $LiB(C_2O_4)_2$ (lithium bis(oxalato) borate; LiBOB), and a combination thereof, and these may be included as a supporting electrolytic salt. The concentration of the lithium salt may be in the range of 0.1 M to 2.0 M.

When the concentration of the lithium salt is in the above range, the electrolyte has appropriate conductivity and viscosity. Accordingly, the electrolyte may exhibit excellent electrolyte performance and may enable lithium ions to move effectively.

In one embodiment, the non-aqueous organic solvent may include at least one selected from dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), fluoroethylene carbonate (FEC), vinylene carbonate (VC), acetonitrile, succinonitrile (SN), dimethylsulfoxide, dimethylformamide, dimethylacetamide, gamma butyrolactone, and tetrahydrofuran.

In one embodiment, the non-aqueous organic solvent may include a mixed solvent of ethylene carbonate (EC) and ethylmethyl carbonate (EMC) or a mixed solvent of ethylene carbonate (EC), ethylmethyl carbonate (EMC), and diethylene carbonate (DEC).

The electrolyte for the lithium battery may further include other additives to improve stability of the SEI film or a thin film on the surface of a battery and thus to improve cyclic characteristics.

The additive may be, for example, tris(trimethylsilyl) phosphate (TMSPa), lithium difluorooxalatoborate (Li-FOB), vinylene carbonate (VC), propane sultone (PS), succinonitrile (SN), $LiBF_4$, a silane compound having a functional group capable of forming a siloxane bond such as acryl, amino, epoxy, methoxy, ethoxy, vinyl, etc., a silazane compound such as hexamethyldisilazane, or the like. These additives may be added alone or in combination of two or more of these.

A lithium battery according to another embodiment includes a positive electrode, an negative electrode, and an electrolyte for the lithium battery between the positive electrode and the negative electrode. The lithium battery is not limited in its shape, and may be a lithium secondary battery such as a lithium-ion battery, a lithium ion polymer battery, and a lithium sulfur battery, as well as a lithium primary battery. The lithium battery may be manufactured by a manufacturing method known in the related art.

The positive electrode may include a positive electrode current collector and a positive active material layer formed on the positive electrode current collector.

The positive electrode current collector may have a thickness of 3 μm to 500 μm. The positive electrode current collector is not limited as long as it has electrical conductivity without causing a chemical change in a battery. A material for the positive electrode current collector may be, for example, copper, stainless steel, aluminum, nickel, titanium, calcinated carbon, copper or stainless steel surface-treated with carbon, nickel, titanium, silver, or the like; or aluminum-cadmium alloy. In one embodiment, fine uneven structures may be formed on the surface of the positive electrode current collector to enhance the bonding force of the positive active material, and the positive electrode current collector may be used in various forms such as a film, a sheet, a foil, a net, a porous body, a foam, or a nonwoven fabric.

The positive active material layer includes a positive active material, a binder, and, optionally, a conductive material.

The positive active material may be any material conventionally used in the art. For example, the positive active material may include a compound represented by any one selected $Li_aA_{1-b}B_bD_2$ (where $0.90 \le a \le 1$, and $0 \le b \le 0.5$); $Li_aE_{1-b}BbO_{2-c}D_c$ (where $0.90 \le a \le 1$, $0 \le b \le 0.5$, $0 \le c \le 0.05$); $LiE_{2-b}B_bO_{4-c}D_c$ (where $0 \le b \le 0.5$, $0 \le c \le 0.05$); $Li_aNi_{1-b-c}Co_bB_cD_\alpha$ (where $0.90 \le a \le 1$, $0 \le b \le 0.5$, $0 \le c \le 0.05$, $0 < \alpha \le 2$); $Li_aNi_{1-b-c}Co_bB_cO_{2-\alpha}$ (where $0.90 \le a \le 1$, $0 \le b \le 0.5$, $0 \le c \le 0.05$, $0 < \alpha < 2$); $Li_aNi_{1-b-c}Co_bB_cO_{2-\alpha}F_2$ (where $0.90 \le a \le 1$, $0 \le b \le 0.5$, $0 \le c \le 0.05$, $0 < \alpha < 2$); $Li_aNi_{1-b-c}Mn_bB_cD_\alpha$ (where $0.90 \le a \le 1$, $0 \le b \le 0.5$, $0 \le c \le 0.05$, $0 < \alpha < 2$); $Li_aNi_{1-b-c}Mn_bB_cO_{2-\alpha}F_\alpha$ (where $0.90 \le a \le 1$, $0 \le b \le 0.5$, $0 \le c \le 0.05$, $0 < \alpha < 2$); $Li_aNi_{1-b-c}Mn_bB_cO_{2-\alpha}F_2$ (where $0.90 \le a \le 1$, $0 \le b \le 0.5$, $0 \le c \le 0.05$, $0 < \alpha < 2$); $Li_aNi_bE_cG_dO_2$ (where $0.90 \le a \le 1$, $0 \le b \le 0.9$, $0 \le c \le 0.5$, $0.001 \le d \le 0.1$); $Li_aNi_{b-}Co_cMn_dGeO_2$ (where $0.90 \le a \le 1$, $0 \le b \le 0.9$, $0 \le c \le 0.5$, $0 \le d \le 0.5$, $0.001 \le e \le 0.1$); $Li_aNiG_bO_2$ (where $0.90 \le a \le 1$, $0.001 \le b \le 0.1$); $Li_aCoG_bO_2$ (where $0.90 \le a \le 1$, $0.001 \le b \le 0.1$); $Li_aMnG_bO_2$ (where $0.90 \le a \le 1$, $0.001 \le b \le 0.1$); $Li_aMn_2G_bO_4$ (where $0.90 \le a \le 1$, $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the chemical formulae above, A is Ni, Co, Mn, or a combination thereof; B is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

In one embodiment, the positive active material may be, as a lithium-containing metal oxide, at least one of composite oxides of lithium and a metal selected from cobalt, manganese, nickel, and a combination thereof. In one embodiment, the positive active material may be $LiCoO_2$, $LiMn_xO_{2x}$ (x=1, 2), $LiNi_{1-x}Mn_xO_{2x}$ ($0<x<1$), $LiNi_{1-x-y}Co_xMn_yO_2$ ($0 \le x \le 0.5$, $0 \le y \le 0.5$), $FePO_4$ or the like.

In one embodiment, these compounds may have a coating layer on the surfaces thereof, or these compounds may be mixed with a compound having a coating layer. The coating layer may include a coating element compound, such as an oxide of a coating element, a hydroxide of a coating element, an oxyhydroxide of a coating element, an oxycarbonate of a coating element, or a hydroxycarbonate of a coating element. Compounds constituting these coating layers may be amorphous or crystalline. As a coating element included in a coating layer, Mg, Al, Co, K, Na, Ca, Si, Ti, V, Sn, Ge, Ga, B, As, Zr, or a mixture thereof may be used. A process for forming coating layers may be any coating method as long as the process do not adversely affect physical properties of the positive active material by using these elements (for example, spray coating, dipping, etc.), which is understood by those skilled in the art, so a detailed description thereof will be omitted.

The binder may enable positive active material particles to be bonded to each other and to the positive electrode current collector, and Examples of the binder are polyvinyl alcohol, carboxymethylcellulose, hydroxypropylcellulose, diacetylcellulose, polyvinyl chloride, carboxylated polyvinyl chloride, polyvinyl fluoride, a polymer containing ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, and nylon, but are not limited thereto.

The conductive material is used for providing conductivity to an electrode. Any conductive material may be used for this purpose as long as it does not cause any chemical change in a battery and is an electron-conductive material. The conductive material may be, for example, selected from natural graphite, artificial graphite, carbon black, acetylene black, ketjen black, carbon fiber; copper, nickel, aluminum, and silver in the form of powder or fiber; polyphenylene derivative, and a combination of two or more of these.

The negative electrode includes an negative electrode current collector and an negative active material layer formed on the negative electrode current collector.

The negative electrode current collector may have a thickness of 3 μm to 500 μm. The negative electrode current collector is not limited as long as it has electrical conductivity without causing a chemical change in a battery. A material for the negative electrode current collector may be, for example, copper, stainless steel, aluminum, nickel, titanium, calcinated carbon, copper or stainless steel surface-treated with carbon, nickel, titanium, silver, or the like; or aluminum-cadmium alloy. In one embodiment, fine uneven structures may be formed on the surface of the negative electrode current collector to enhance the bonding force of the negative active material, and the negative electrode current collector may be used in various forms such as a film, a sheet, a foil, a net, a porous body, a foam, or a nonwoven fabric.

The negative active material layer includes a negative active material, a binder, and, optionally, a conductive material.

The negative active material may be any material conventionally used in the art.

In one embodiment, the negative active material may be lithium metal, the lithium-alloyable metal, transition metal oxide, a material capable of doping and dedoping lithium, or a material capable of reversibly intercalating and deintercalating lithium ions. Two or more of these may be mixed or bonded together for use.

In one embodiment, the lithium-alloyable metal may be Si, Sn, Al, Ge, Pb, Bi, Sb, Si—Y alloy (where Y is alkali metal, alkali earth metal, a Group 13 element, a Group 14 element, transition metal, rare earth element, or a combination thereof element and is not Si), or Sn—Y alloy (where Y is alkali metal, alkali earth metal, a Group 13 element, a Group 14 element, transition metal, rare earth element, or a combination thereof element and is not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Non-limiting examples of the transition metal oxide may be tungsten oxide, molybdenum oxide, titanium oxide, lithium titanium oxide, vanadium oxide, lithium vanadium oxide, and the like.

The material capable of doping and dedoping lithium may be, for example, Sn, $SnO_2$, or a Sn—Y alloy (where Y is alkali metal, alkali earth metal, a Group 11 element, a Group 12 element, a Group 13 element, a Group 14 element, a Group 15 element, a Group 16 element, transition metal, rare earth element, or a combination thereof element and is not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material capable of reversibly intercalating and deintercalating lithium ions may be a carbonaceous material, for example, any carbonaceous negative active material that is usually used in a lithium battery. In one embodiment, the carbonaceous material may be a crystalline carbon, an amorphous carbon, or a mixture thereof. Non-limiting examples of the crystalline carbon include natural graphite, artificial graphite, expanded graphite, graphene, fullerene soot, carbon nanotube, carbon fiber, and the like. Non-limiting examples of the amorphous carbon include soft carbon, hard carbon, mesophase pitch carbide, calcinated coke, and the like. The carbonaceous negative active material may be used in spherical, plate, fibrous, tube or powder form.

The binder may enable negative active material particles to be bonded to each other and to be bonded on a current collector, and examples of the binder are polyvinyl alcohol, carboxymethylcellulose, hydroxypropylcellulose, diacetylcellulose, polyvinyl chloride, carboxylated polyvinyl chloride, polyvinyl fluoride, a polymer containing ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, and nylon, but are not limited thereto.

The conductive material is used for providing conductivity to an electrode. Any conductive material may be used for this purpose as long as it does not cause any chemical change in a battery and is an electron-conductive material. Examples of the conductive material are carbon-based materials such as natural graphite, artificial graphite, carbon black, acetylene black, or ketjen black; metal material such as copper, nickel, aluminum, and silver, in the form of metal powder or metal fiber; a conductive polymer such as a polyphenylene derivative; and a mixture thereof.

For each of the positive electrode and the negative electrode, a corresponding active material, a conductive material, and a binder are mixed in a solvent to prepare an active material composition, and the active material composition is coated on a corresponding current collector.

Since the method of manufacturing such an electrode is well known in the art, the detailed description thereof will be omitted herein. As the solvent, N-methylpyrrolidone (NMP), acetone, water and the like may be used, but the solvent is not limited thereto.

The positive electrode and the negative electrode may be separated by a separator, and the separator may be any material that is used for a lithium battery in the art. A material for forming the separator may be a material that has a low resistance to ion migration of an electrolyte and has excellent electrolytic solution-retaining capability. In one embodiment, the separator forming material may be selected from glass fiber, polyester, Teflon, polyethylene, polypropylene, polytetrafluoroethylene (PTFE), and a combination thereof, each of which may be in a non-woven fabric or woven fabric form. The separator may have a pore diameter of 0.01 μm to 10 μm and a thickness of 3 μm to 100 μm.

The separator may be a single film or a multilayer film. In one embodiment, the separator may be a single film formed of the olefin-based polymer, such as poly ethylene, polypropylene, or polyvinylidene fluoride, or a multilayer film of these. In one embodiment, the separator may be a mixed multilayer film, such as a two-layered separator having the structure of polyethylene/polypropylene, a three-layered separator having the structure of polyethylene/polypropylene/polyethylene, or a three-layered separator having the structure of polypropylene/polyethylene/polypropylene.

When a solid electrolyte such as a polymer is used as an electrolyte, the solid electrolyte may also act as the separator.

Figure 1:
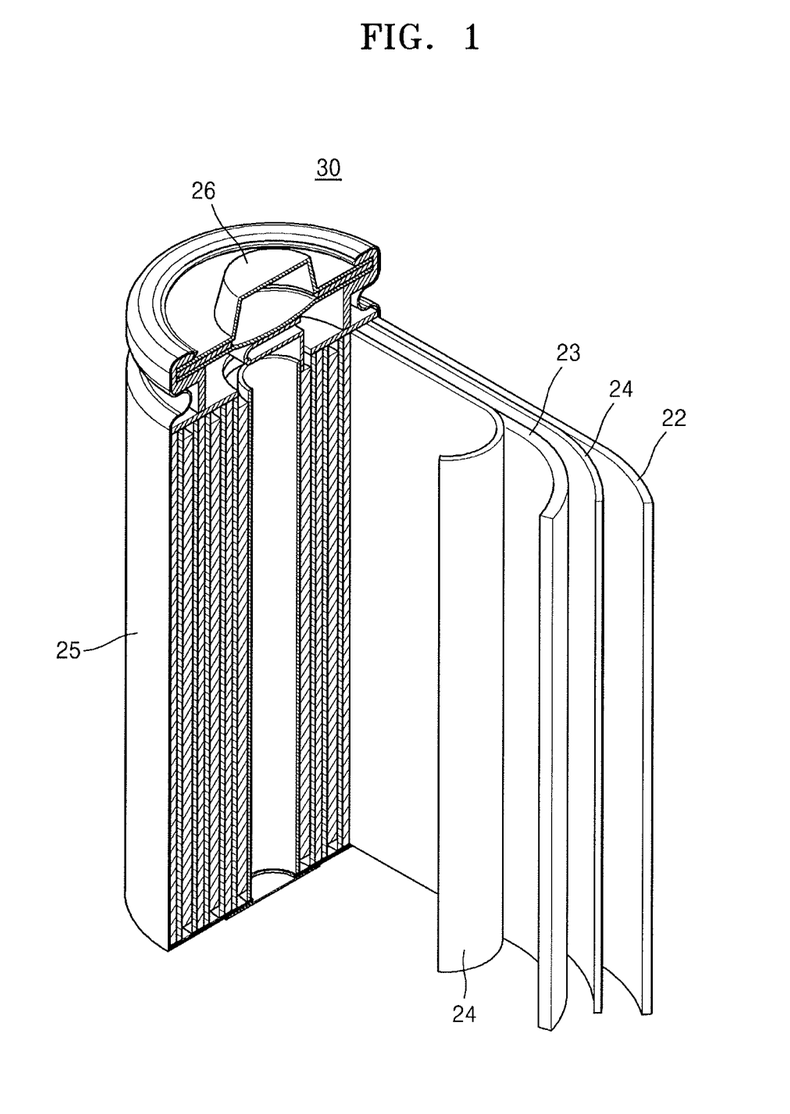
FIG. 1 is a schematic diagram of a lithium battery according to an embodiment.

FIG. 1 shows a schematic view of a lithium battery 30 according to an embodiment.

Referring to FIG. 1, the lithium battery 30 includes a positive electrode 23, a negative electrode 22, and a separator 24 between the positive electrode 23 and the negative electrode 22. The positive electrode 23, the negative electrode 22, and the separator 24 are wound or folded and housed in a battery case 25. Then, an electrolyte is injected into the battery case 25 and sealed with a sealing member 26 to complete the manufacture of the lithium battery 30. The battery case 25 may have a cylindrical shape, a rectangular shape, a thin film shape, or the like. For example, the lithium battery 30 may be a large-film battery. The lithium battery 30 may be a lithium-ion battery.

A battery assembly may be formed by placing a separator between a positive electrode and a negative electrode. Battery assemblies are stacked in a bi-cell structure, impregnated with an organic electrolytic solution, and the obtained structure was housed and sealed in a pouch to complete the production of a lithium ion polymer battery.

In one or more embodiments, a plurality of battery assemblies are stacked to form a battery pack, which is used in all devices requiring high capacity and high output. For example, the battery pack may be used in notebooks, smartphones, electric vehicles, and the like.

Since a lithium battery has excellent lifetime characteristics and high-rate characteristics, the lithium battery may be used in, for example, an electric vehicle (EV). For example, the lithium battery may be used in a hybrid vehicle such as a plug-in hybrid electric vehicle (PHEV). The lithium battery may be used for electric bicycles, power tools and all other applications, requiring high output, high voltage and high-temperature driving.

Embodiments of the present disclosure will be described in more detail with reference to the following examples and comparative examples. These examples are provided herein for illustrative purpose only, and do not limit the scope of the present disclosure.

Preparation Example 1

As an additive, a compound represented by Formula 2 below was prepared as follows.

First, a mixture of phosphorus (V) oxide (1.42 g; 0.01 mol) and tris(trimethylsilyl)borate (2.78 g; 0.01 mol) in benzene was heated and refluxed for 1.5 hours to prevent moisture from air. After the heating source was removed, the reaction mixture was left under stirring until the temperature thereof reached room temperature. A clear solution of the product formed in the reaction flask was separated from the precipitate by decantation under a dry atmosphere. The solvent was removed from the decanted solution by distillation with a rotary evaporator in a bath at a temperature of 50° C. The residual colorless solid was placed under an oil pump of high dynamic vacuum for an additional 15 hours to remove any remaining volatile impurities therefrom. The yield of the product was 3.59 g.

$$[P_4O_{10}]_x \cdot [B(OSi(CH_3)_3)_3]_y \quad \text{Formula 2}$$

In the above equation, the molar ratio of x to y (x/y) was 0.5.

The $^{31}P$ NMR spectrum (400 MHz, DMSO-d6) results of the compound are as follows: δ −15.95÷−18.12 (broad multiplet), −20.77 (low intensity singlet), −21.23 (high intensity singlet), −24.84÷−26.96 (broad multiplet), −27.71 (high intensity singlet).

EXAMPLES

Example 1

$LiPF_6$ was added in the concentration of 0.9 M to a mixed solvent including ethylene carbonate (EC), ethyl methyl carbonate (EMC) and diethyl carbonate (DEC) in a volume ratio of 30:50:20 as a non-aqueous organic solvent, and the additive of Formula 2 prepared according to Preparation Example 1 was added thereto in an amount of 0.5 wt % based on 100% by weight of the total weight of the electrolyte and dissolved, thereby completing the preparation of an electrolyte.

Meanwhile, the positive active material powder having the composition of $LiCoO_2$ and a carbon conductive material (Super-P; Timcal Ltd.) were homogeneously mixed at a weight ratio of 90:5, and then, a polyvinylidene fluoride (PVDF) binder solution was added thereto to prepare a positive active material slurry in which the ratio of the positive active material powder, the carbon conductive material, and binder was 90:5:5. The positive active material slurry was coated on an aluminum foil having a thickness of 15 μm, followed by drying and roll-pressing to prepare a positive electrode.

Also, N-methylpyrrolidone was added to the mixture including graphite (MC20), which was a negative active material, and a PVDF binder at a weight ratio of 1:1 to adjust the viscosity in such a way that the solid content was 60 wt %, thereby preparing an negative active material slurry. The negative active material slurry was coated on a copper foil having a thickness of 15 μm, followed by drying and roll-pressing to prepare an negative electrode.

A 2016 type full cell was fabricated by using the positive electrode, the negative electrode, and the separator formed of polyethylene (product name: STAR20, Asahi) having a thickness of 20 μm.

Example 2

A full cell was prepared in the same manner as in Example 1, except that the amount of the compound of Formula 2 was changed to 1 wt %.

Comparative Example 1

A full cell was prepared in the same manner as in Example 1, except that the compound of Formula 2 was not added and an electrolyte was prepared by adding, to a mixed solvent in which the volume ratio of EC:DMC:DEC was 30:50:20, to $LiPF_6$ such that the concentration of $LiPF_6$ in the resultant solution was 0.9 M.

Comparative Example 2

A full cell was prepared in the same manner as in Example 1, except that the amount of the compound of Formula 2 was changed to 2 wt %.

Evaluation Example 1: Evaluation of Charging and Discharging Characteristics at High Temperature (45° C.)

The lithium batteries manufactured according to Examples 1 and 2 and Comparative Examples 1 and 2 were subjected to constant-current charging at a current of 0.1 C rate at a temperature of 25° C. until the voltage reached 4.4 V (vs. Li), and then maintained at 4.4 V in the constant voltage mode and cut off at a current of 0.05 C rate. Then, discharging was performed thereon at a constant current of 0.1 C rate until the voltage reached 2.75 V (vs. Li) (Formation process, 1$^{st}$ cycle).

A lithium battery that had underwent the 1$^{st}$ cycle of the formation process was constant-current charged at a temperature of 25° C. at a current of 0.2 C rate until the voltage reached 4.4 V (vs. Li), followed by a cut-off at a current of 0.05 C rate while maintaining a constant voltage of 4.4 V. Then, discharging was performed thereon at a constant current of 0.2 C rate until the voltage reached 2.75 V (vs. Li) (Formation process, 2$^{nd}$ cycle).

A lithium battery that had underwent the 2$^{nd}$ cycle of formation process was constant-current charged at a temperature of 45° C. at a current of 1.0 C rate until the voltage reached 4.4 V (vs. Li), followed by a cut-off at a current of 0.05 C rate while maintaining a constant voltage of 4.4 V. Subsequently, a cycle of discharging at a constant current of 1.0 C rate until the voltage reached 2.75 V (vs. Li) during discharging, was repeatedly performed up to the 150$^{th}$ cycle.

There was a stopping time of 10 minutes after one charge/discharge cycle in all charge/discharge cycles.

Figure 2:
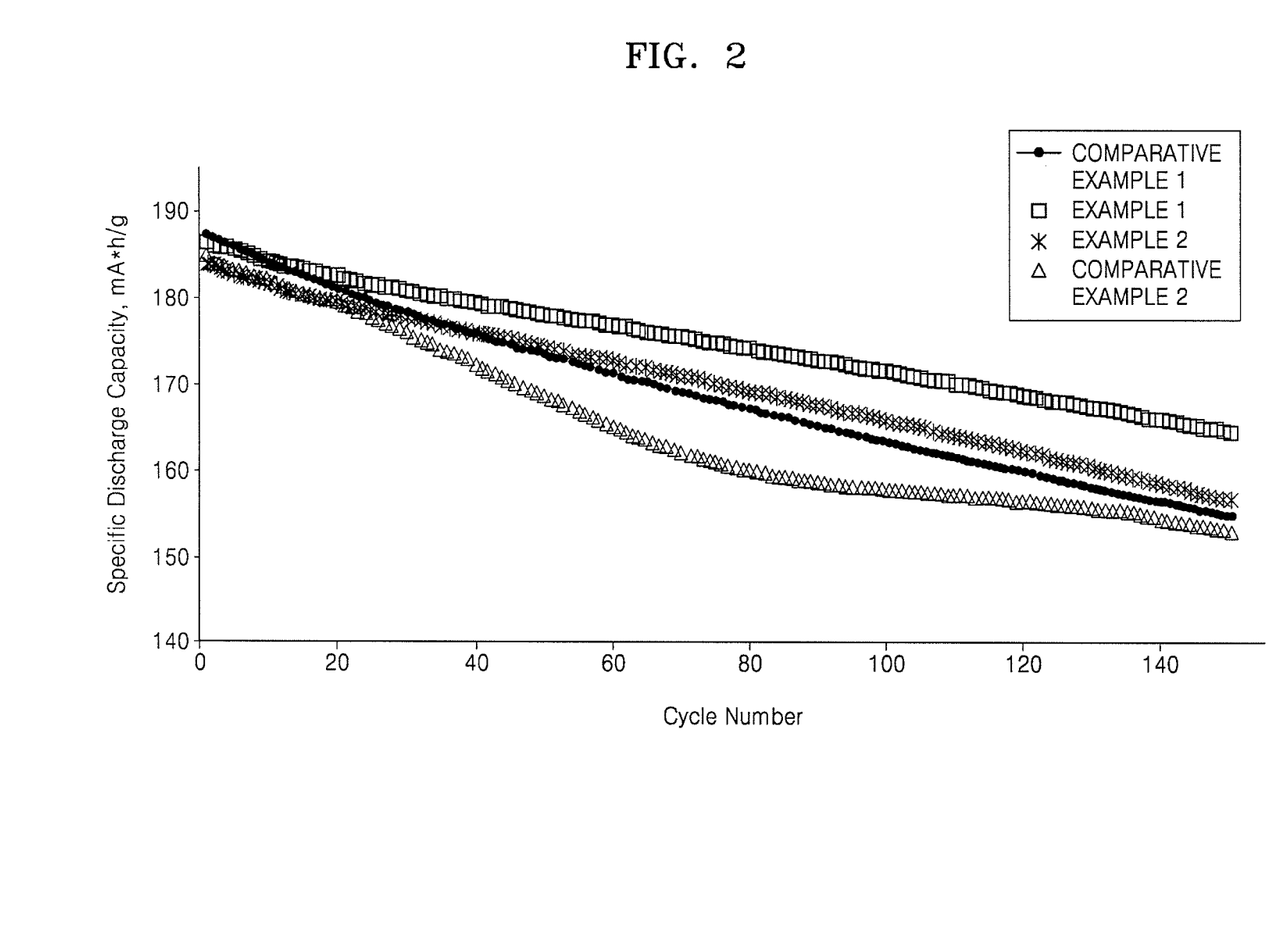
FIG. 2 is a graph showing discharge capacities per cycle of lithium batteries manufactured according to Examples 1 and 2 and Comparative Examples 1 and 2.
Figure 3:
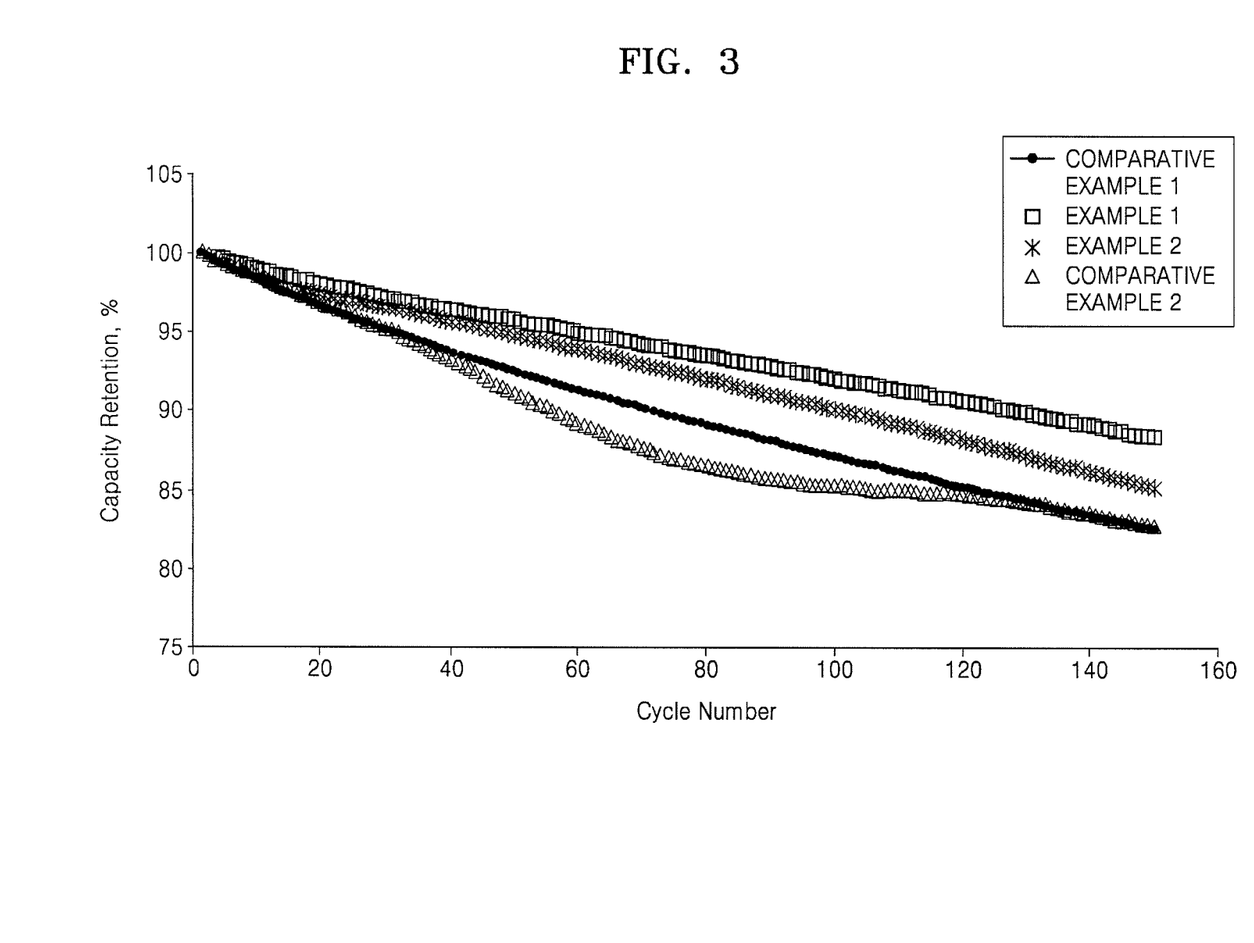
FIG. 3 is a graph showing the capacity retention ratios per cycle of lithium batteries manufactured according to Examples 1 and 2 and Comparative Examples 1 and 2.

The discharge capacity of each of the lithium batteries manufactured according to Examples 1 and 2 and Comparative Examples 1 and 2 is shown in FIG. 2, and the capacity retention ratio of each of the lithium batteries manufactured according to Examples 1 and 2 and Comparative Examples 1 and 2 is shown in FIG. 3.

Here, the capacity retention ratio (CRR) is defined as Equation 1 below.

Capacity retention ratio [%]=[Discharge capacity in each cycle/Discharge capacity in 1$^{st}$ cycle]×100    <Equation 1>

As shown in FIG. 2, the lithium batteries of Examples 1 and 2 have a smaller decrease in discharge capacity as the cycle progresses than the lithium batteries of Comparative Examples 1 and 2.

Also, as shown in FIG. 3, it can be seen that the lithium batteries of Examples 1 and 2 have a significantly improved life characteristic at high temperature as compared with the lithium batteries of Comparative Examples 1 and 2.

Figure 4:
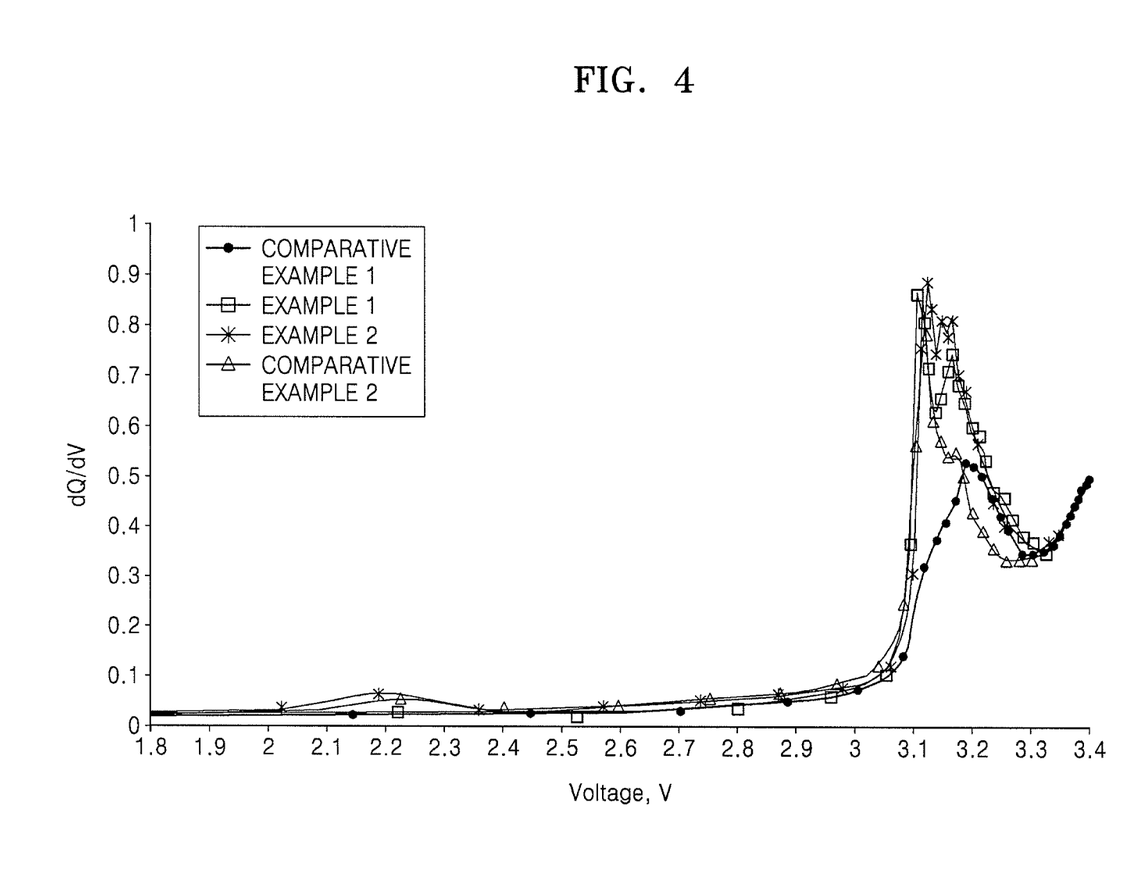
FIG. 4 shows a differential charge/discharge (dQ/dV) curve in the first cycle of the lithium batteries manufactured according to Examples 1 and 2 and Comparative Examples 1 and 2.

FIG. 4 shows a differential charge/discharge (dQ/dV) curve in the first cycle of the lithium batteries manufactured according to Examples 1 and 2 and Comparative Examples 1 and 2.

As shown in FIG. 4, the lithium batteries of Examples 1 and 2 and Comparative Example 2 have slightly broad redox peaks in the range of about 2.0 V to about 2.2 V and a remarkable redox peak at about 3.1 V. On the other hand, the lithium battery of Comparative Example 1 has a redox peak at 3.2 V. This is because the lithium batteries of Examples 1 and 2 and Comparative Example 2 in which the compound of Formula 2 was added was decomposed earlier than the existing non-aqueous organic solvent during the initial charging in the formation process to form a stable SEI layer. However, when the compound of Formula 2 is contained in an excessive amount as in the lithium battery of Comparative Example 2, the SEI layer is formed to be too thick, which may increase the resistance and deteriorate the discharge capacity and lifetime characteristics at high temperatures.

Hereinbefore, example embodiments of the present disclosure have been particularly shown and described with reference to drawings and Examples. However, it is to be understood by one of ordinary skill in the art that the present disclosure is not limited to the example embodiments and various modifications and variations thereof may be made in the present disclosure. Accordingly, the scope of protection of the present disclosure should be determined by the appended claims.

EXPLANATION OF REFERENCE NUMERALS DESIGNATING THE MAJOR ELEMENTS OF THE DRAWINGS

30: lithium battery
22: negative electrode
23: positive electrode
24: separator
25: battery case
26: sealing member

The invention claimed is:

1. An additive for an electrolyte for a lithium battery, the additive comprising a compound represented by Formula 1:

[P$_4$O$_{10}$]$_x$-[B(OSiR$^1$R$^2$R$^3$)$_3$]$_y$,      Formula 1 wherein:
R$^1$, R$^2$, and R$^3$ are each independently a substituted or unsubstituted C1-C30 alkyl group, a substituted or unsubstituted C2-C20 alkenyl group, a substituted or unsubstituted C2-C20 alkynyl group, or a substituted or unsubstituted C6-C20 aryl group, and
a molar ratio of x toy (x/y) is in the range of 0.025 to 2.5.

2. The additive of claim 1, wherein R$^1$, R$^2$, and R$^3$ in Formula 1 are each independently a substituted or unsubstituted C1-C30 alkyl group.

3. The additive of claim 1, wherein the compound is represented by Formula 2:

[P$_4$O$_{10}$]$_x$-[B(OSi(CH$_3$)$_3$)$_3$]$_y$,      Formula 2 wherein the molar ratio of x toy (x/y) in Formula 2 is in the range of 0.025 to 2.5.

4. The additive of claim 1, wherein the compound has an oligomeric form.

5. An electrolyte for a lithium battery, the electrolyte comprising
a non-aqueous organic solvent;
a lithium salt; and
the additive according to claim 1.

6. The electrolyte of claim 5, wherein an amount of the additive is in the range of 0.001 wt % to 10 wt % based on the total weight of the electrolyte.

7. The electrolyte of claim 5, wherein an amount of the additive is in the range of 0.01 wt % to 5 wt % based on the total weight of the electrolyte.

8. The electrolyte of claim 5, wherein the non-aqueous organic solvent includes at least one selected from a carbonate solvent, an ester solvent, an ether solvent, a ketone solvent, an alcohol solvent, and an aprotic solvent.

9. The electrolyte of claim 5, wherein the non-aqueous organic solvent includes at least one selected from dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), fluoroethylene carbonate (FEC), vinylene carbonate (VC), acetonitrile, succinonitrile (SN), dimethylsulfoxide, dimethylformamide, dimethylacetamide, gamma butyrolactone, tetrahydrofuran, and ethylene propane (EP).

10. The electrolyte of claim 5, wherein
the lithium salt is at least one selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are each a natural number), LiCl, LiI, $LiB(C_2O_4)_2$ (lithium bis(oxalato) borate; LiBOB), and a combination thereof.

11. The electrolyte of claim 5, wherein
a concentration of the lithium salt is in the range of 0.1 M to 2.0 M.

12. A lithium battery comprising:
a positive electrode;
a negative electrode; and
the electrolyte of claim 8.

13. A lithium battery, comprising:
a positive electrode;
a negative electrode; and
an electrolyte, wherein:
the electrolyte includes:
 a non-aqueous organic solvent;
 a lithium salt; and
 an additive, and
the additive is a compound is represented by Formula 2:

$$[P_4O_{10}]_x \cdot [B(OSi(CH_3)_3)_3]_y \qquad \text{Formula 2}$$

in which the molar ratio of x to y (x/y) in Formula 2 is 0.5.

* * * * *